United States Patent [19]

Daley et al.

[11] Patent Number: 4,643,887
[45] Date of Patent: Feb. 17, 1987

[54] PRODUCTION OF SULFUR TRIOXIDE, SULFURIC ACID AND OLEUM

[75] Inventors: William D. Daley, Morristown; James Jaffe, Lake Hopatcong, both of N.J.

[73] Assignee: General Chemical Corporation, Morristown, N.J.

[21] Appl. No.: 412,051

[22] Filed: Aug. 26, 1982

[51] Int. Cl.$^4$ .................. C01B 17/74; C01B 17/48
[52] U.S. Cl. .................. 423/533; 423/522; 423/529; 422/161
[58] Field of Search .............. 423/522, 529, 533, 535, 423/536; 422/160, 161

[56] References Cited

U.S. PATENT DOCUMENTS

| | | | |
|---|---|---|---|
| 652,119 | 6/1900 | Knietsch | 423/533 |
| 2,510,684 | 6/1950 | Cathala | 423/529 |
| 3,282,645 | 11/1966 | Mandeuk | 423/535 |
| 3,475,119 | 10/1969 | Hummel | 423/529 |
| 3,803,297 | 4/1974 | Guth et al. | 423/533 |
| 3,997,655 | 12/1976 | Reh et al. | 423/522 |
| 4,213,958 | 7/1980 | Cameron et al. | 423/533 |
| 4,296,088 | 10/1981 | Stauffer | 423/533 |

FOREIGN PATENT DOCUMENTS

| | | | |
|---|---|---|---|
| 100671 | 4/1937 | Australia | 423/536 |
| 2647772 | 4/1978 | Fed. Rep. of Germany | 423/533 |
| 51-6893 | 1/1976 | Japan | 423/535 |
| 637585 | 5/1950 | United Kingdom | 423/522 |
| 1150953 | 5/1969 | United Kingdom | 423/535 |

OTHER PUBLICATIONS

Snowball, A. F., A Cyclic Process of Sulphuric Acid Manufacture at Trail BC, Canadadiaa Chemistry & Process Industries, Dec. 1947, pp. 1110-1114.

Primary Examiner—Gary P. Straub
Attorney, Agent, or Firm—Arthur J. Plantamura; Alan M. Doernberg

[57] ABSTRACT

A feed gas mixture with $SO_2$ partial pressure of at least about 0.5 atmosphere and an $O_2:SO_2$ mole ratio of between about 0.7:1 and about 1:1 is passed in plug flow through a packed bed of conversion catalyst. The catalyst bed is cooled to produce a temperature profile including a first zone of increasing temperature, a second zone of substantially constant temperature and a third zone of declining temperature. The exit temperature is sufficiently low for high equilibrium conversion values. The effluent is cooled to condense liquid sulfur trioxide, while the sulfur trioxide remaining in the gas stream can be absorbed into oleum and/or sulfuric acid. Enriched oleum can be prepared by blending condensed sulfur trioxide into oleum or sulfuric acid.

12 Claims, 1 Drawing Figure

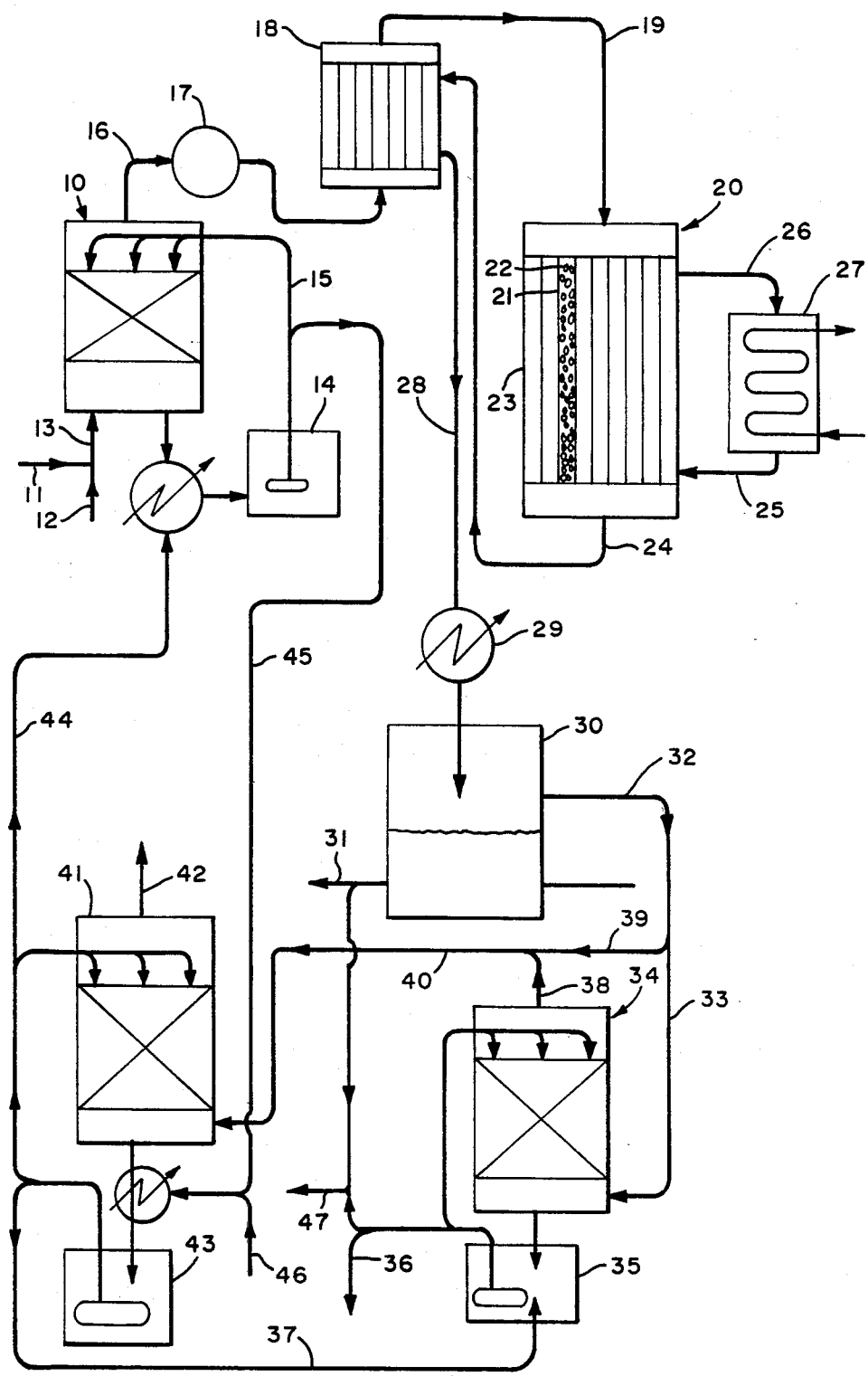

PRODUCTION OF SULFUR TRIOXIDE, SULFURIC ACID AND OLEUM

BACKGROUND OF THE INVENTION

The present invention relates to the production of sulfur trioxide, sulfuric acid and oleum, and especially to such processes wherein the conversion of sulfur dioxide to sulfur trioxide takes place at superatmospheric pressure and at least a portion of the effluent from the converter is cooled to directly condense sulfur trioxide.

The well-known process for the production of sulfuric acid involve three basic steps: burning sulfur to form sulfur dioxide, converting the sulfur dioxide catalytically to sulfur trioxide by reaction with air and absorbing the sulfur trioxide from the effluent from the converter in an absorption tower. In such processes, the unreacted sulfur dioxide content of the converter effluent has caused problems in that the remaining sulfur dioxide represents an unacceptable emission to the atmosphere. Accordingly, double effect systems have been used wherein the unabsorbed vapor from the absorption tower is mixed with air and again catalytically converted, with the effluent from the second convertor passed through a second absorption tower. Such processes involve high capital costs and generally product only sulfuric acid as product.

High pressure processes have also been proposed, but because of capital requirements have not been commercially practiced widely, wherein either the feed to the burner or the feed from the burner to the converter are pressurized so as to improve the yield of sulfur trioxide and thereby reduce the unreacted sulfur dioxide content of the converter effluent.

Various sources of sulfur dioxide are now becoming available from desulfurization of flue gases, and some such sources produce sulfur dioxide of greater than 12% concentration. Thus far, such concentrated sulfur dioxide is sometimes reduced to sulfur, which in turn may be fed to the burner of a sulfuric acid plant. The sulfur dioxide can also be diluted and fed to a conventional converter, but such processes have all the disadvanatages of a conventional sulfuric acid process.

Oleum, that is sulfuric acid containing sulfur trioxide in excess of the stoichometric amount to react with water to form sulfuric acid, is conventionally produced by absorbing sulfur trioxide in sulfuric acid. Such direct absorption has the disadvantage that the greatest concentration practically achievable is about 25%. Higher concentrations are achieved by desorbing sulfur trioxide from 20 or 25% oleum, condensing the sulfur trioxide and then mixing condensed sulfur trioxide with 20% oleum. Liquid sulfur trioxide is also conventionally produced by stripping 20% oleum and then condensing the stripped gases. All such processes have high capital and energy requirements, and are generally limited to the production of one or a limited number of the various products desired.

U.S. Pat. No. 4,213,958 to Cameron et al. (July 22, 1980) discloses a process for the production of sulfuric acid as the main product and, optionally, liquid sulfur trioxide as a secondary product. In this process inlet air is pressurized to about 20 atmospheres after drying and the conversion step is operated at such pressure. As a result, the converter effluent, after a 99 or 99.7% conversion, can be cooled to directly condense a portion of the sulfur trioxide, along with a portion of the unreacted sulfur dioxide. The sulfur trioxide remaining in the vapor phase is passed through a conventional absorber, operating however at 20 atmospheres pressure, and the sulfuric acid formed is depressurized by passage through a turbine before passage through an air drying tower where it passes in mass exchange with incoming reaction gases. As a result, the sulfur dioxide content of the sulfuric acid passing through the turbine is released to the reaction gases, while the water vapor in the reaction gases is absorbed in the sulfuric acid. Sulfuric acid from the drying tower is stored, with a portion taken as product and a remaining portion pumped back to 20 atmospheres pressure by a pump driven at least in part by the turbine and returned to the high pressure absorption tower. While such a process has additional flexibility in being able to produce sulfur trioxide directly and to produce sulfuric acid, it has the disadvantage of requiring extremely high pressures and resulting high work requirements to drive both the air compressors and the acid pump to the extent of inefficiencies in the turbine and the pump. Furthermore, at the high pressures indicated, the sulfur dioxide content of the liquified sulfur trioxide renders it a less desirable product than sulfur trioxide formed by stripping oleum and recondensing the vapor.

BRIEF DESCRIPTION OF THE INVENTION

The present invention includes a process for the production of sulfur trioxide which comprises the steps:

(a) feeding a gas mixture having a sulfur dioxide partial pressure of at least about 0.5 atmospheres, an oxygen partial pressure of at least about 0.37 atmospheres, an oxygen:sulfur dioxide mol ratio of between about 0.7:1 and about 1:1 and a total pressure between about 1 atmosphere and about 10 atmospheres in plug flow through a bed of conversion catalyst selected from the group consisting of vanadium oxide conversion catalysts and platinum conversion catalysts;

(b) cooling the catalyst bed to produce a first zone wherein the gas mixture increases in temperature from the inlet temperature to a temperature between about 475° C. and about 575° C., a second zone wherein the temperature is substantially constant at a temperature between about 450° C. and about 575° C. and a third zone wherein the temperature is declining from a temperature between about 450° C. and about 575° C. to a temperature between about 325° C. and about 400° C., (c) passing said gas mixture successively through said first, second and third zones with sufficient contact times in said second and third zones to produce a gas mixture with a sulfur trioxide to sulfur dioxide mol ratio of at least about 99:1, (d) cooling said product gas mixture to a temperature between about 35° C. and about 45° C. to produce liquid sulfur trioxide, and (e) separating said liquid sulfur trioxide from the remaining gas stream.

It will be appreciated that the present process does not involve the extremely high pressures of U.S. Pat. No. 4,213,958 and at the same time produces sulfur trioxide directly by condensation of the converter effluent. Furthermore, the remaining gas stream after separating out liquid sulfur trioxide is suitable for use either in an oleum absorption column, a sulfuric acid absorption column or both.

In addition, the practice of the present invention permits a substantial reduction in the catalyst volume compared to adiabatic conversion.

DETAILED DESCRIPTION OF THE INVENTION

The process of the invention includes operation of a single stage converter with a unique feed gas mixture and a unique temperature profile. The feed mixture may be derived from a variety of sources such as sulfur burning in oxygen-enriched air, sulfur dioxide recovered in high strength from flue gases, decomposition of spent alkylation acid with oxygen-enriched air or other sources of sulfur dioxide. The total pressure of the feed gas may vary between about 1 and about 10 atmospheres (about 100 to about 1000 kPa), with total pressures between about 1.4 and about 4.1 atmospheres being preferred. What is more significant than total pressures, however, are the partial pressures of sulfur dioxide and oxygen. The sulfur dioxide partial pressure is at least about 0.5 atmospheres and is preferably at least about 0.8 atmospheres. An especially preferred range of sulfur dioxide partial pressure is between about 0.8 and about 0.9 atmospheres. The oxygen partial pressure may be defined based upon the mole ratio of oxygen to sulfur dioxide. This ratio should be between about 0.7 and about 1:1, preferably between about 0.7:1 and about 0.8:1. Actual oxygen partial pressures ranges for each sulfur dioxide partial pressure can be readily determined using these ratios. It should be appreciated that the stoichiometric ratio is 0.5:1, while most commercial converters operate at about 2:1, considering air fed to all converters.

The temperature profile of reaction gas mixture passing through the single-stage converter should rise to an ignition temperature (generally around 350°–390° C.) and continue to rise to a temperature between about 475° C. and about 575° C. When the gas mixture is available at a temperature near the ignition temperature (e.g. 350°–390° C.) or above the ignition temperature (e.g. 400°–475° C.), it is preferred to use the gas as is for the inlet gas. If the gas mixture is available at a lower temperature, it is preferred to preheat the gas to at least the ignition temperature before introduction onto the catalyst. This region of rising temperature can be considered a first zone. The temperature should then remain substantially constant at temperatures wherein the conversion rate is relatively high such as between about 450° C. and about 575° C. This region of high temperature can be considered a second zone. Temperature variation within the second zone is permissable so long as hot spots which could cause rapid catalyst degredation are avoided. The length (residence time) of the second zone should preferably be sufficient to bring the gas mixture to or near equilibrium values of oxygen, sulfur dioxide and sulfur trioxide. Thereafter, the reaction gases should decline in temperature to a temperature between about 325° C. and about 400° C., still in contact with catalyst. The declining temperature in this region allows the equilibrium-limited conversion to proceed to the desired extent (99 to 99.7%) and at the same time provides conversion rates which are as large as possible in view of the diminished concentrations of sulfur dioxide and oxygen.

Usually the conversion would be expressed as at least about 99% and preferably at least about 99.7% based of sulfur dioxide feed. It is convenient, however, for the present single stage converter, to express these conversion values as a mole ratio of sulfur trioxide to sulfur dioxide as at least about 99:1 and preferably at least about 332:1. It will be appreciated that the sulfur dioxide in the effluent of the converter represents the maximum sulfur dioxide emissions from the system.

The desired temperature profile can be achieved by cooling the reaction zones with various inert gases such as air as described in more detail below. Non-gaseous coolants, such as molten salts, may also be used.

A preferred type of apparatus for the single stage converter is a tube-in-shell device wherein a plurality of tubes (often a hundred or more) each of small diameter are positioned in parallel within a shell, and are preferably equally spaced from each other. Each tube is packed with a conversion catalyst, which may be a vanadium pentoxide catalyst such as vanadium pentoxide with potassium pyrosulfate. While catalysts of the type conventionally used in adiabatic converters are employed in the single stage converter, the quantity of catalyst is substantially reduced, and may be as little as one-eighth to one-tenth the amount required to convert equivalent sulfur dioxide quantities using prior art processes. The catalyst amount required per unit of sulfur dioxide fed is essentially independent of sulfur dioxide concentration. Distribution means are provided to distribute feed gas mixture equally among the tubes so that a similar flow occurs in parallel through the length of each tube. Distribution means are also provided to distribute cooling air within the shell outside the tubes to flow in counter current flow to the flow of reaction gases in heat exchange relation therewith.

The configuration of tubes, extent of use of fins or similar devices on part of all of the length of each tube, total air flow and total reaction gas flow are together determined in order to establish a desired temperature profile within each tube. If fins are used, they may be needed adjacent to the feed gas inlet so as to bring the feed gas quickly to an ignition temperature (e.g. 360° C.) where significant conversion begins to occur. In general, because the tubes are packed with catalyst, turbulence of reaction gases will be adequate for good heat transfer; therefore added surface outside the tubes may be used to increase heat transfer.

As catalyst loses its activity, various conditions, including especially flow rates of feed gas mixture and cooling air, can be adjusted to maintain the desired temperature profile.

Because the cooling air will usually be above the ignition temperature adjacent the cooling air outlet (which corresponds to the feed gas inlet), it must be cooled to a temperature of 350° C. or below before reintroduction into the shell adjacent the reaction gas outlet. This temperature differential (e.g. from 420° C. to 320° C.) enables the cooling to be used for generation of high pressure steam which may be useful elsewhere in the process or for other purposes.

The effluent will contain essentially the same sulfur trioxide partial pressure as the sulfur dioxide partial pressure of the feed gas. The effluent gas is then cooled, for example, by passage through a feed gas preheater, if present, and then through a water-cooled condenser. The feed gas preheater is used if the incoming gases are substantially below the ignition temperature. The water-cooled condenser is operated to achieve a condensation temperature between about 35° C. and about 45° C., preferably about 40° C., causing the sulfur trioxide to condense. Lower condensation temperatures increase the proportion of the sulfur trioxide that condenses, but temperatures so low as to cause solidification or freezing under operating conditions should be avoided.

Since the other gases present have vapor pressures at such temperature in excess of their partial pressures in the effluent, they will not condense. In general, the sulfur trioxide will condense until the remaining partial pressure of sulfur trioxide corresponds to the vapor pressure of sulfur trioxide at the condenser temperature. By contrast, the condensation step proposed in U.S. Pat. No. 4,213,958 condenses a gas mixture with higher total pressure, generally lower sulfur trioxide partial pressure and higher sulfur dioxide partial pressure. The result in that reference is that less of the sulfur trioxide condenses; and whatever does condense becomes mixed with sulfur dioxide and therefore has less value as a product or in making oleum.

The liquid sulfur trioxide is kept as a product, optionally with inhibitors or stabilizers added, and/or is mixed with sulfuric acid to make oleum of any strength or mixed with weak oleum (e.g. 20%) to make stronger oleum (e.g. 65%). Care should be taken during condensation, handling and shipment of liquid sulfur trioxide to avoid temperatures which lead to the formation of various solid and/or polymeric forms of sulfur trioxide. The condensation can be operated at a temperature to maximize liquid sulfur trioxide recovery (e.g. 35°–40° C.) or, with less cooling, or at a temperature whereat the liquid sulfur trioxide recovery is less (e.g. 40°–45° C.). The effect, overall, of higher condensation temperatures is to increase sulfuric acid and/or oleum production and to decrease liquid sulfur trioxide production.

The remaining gas stream can be used to produce oleum or sulfuric acid or both in conventional absorption towers. Since the gas may be at superatmospheric pressures, even after condensation of sulfur trioxide, the size of the absorption towers may be reduced or their capacities improved compared to conventional systems. Pressure may be released prior to absorption or between an oleum tower and a sulfuric tower; but preferably all absorption occurs at high pressure. The gases left after absorption may be vented (optionally after an expansion step for energy recovery) since the sulfur dioxide content has been sufficiently lowered during conversion to meet emissions standards.

DESCRIPTION OF THE PREFERRED EMBODIMENTS

FIG. 1 shows an embodiment of the present process suitable when sources of sulfur dioxide of high concentration are available, as in the case of sulfur dioxide produced by the scrubbing of flue stacks of fossil fuel plants and the like.

In FIG. 1 a drying column 10 is shown; and fed to the bottom of the drying column 10 is an air stream 11 and a sulfur dioxide stream 12, conveniently mixed together as inlet gas stream 13. Inlet gas stream 13 may contain water vapor either from the sulfur dioxide or from the air or both. Highly concentrated sulfuric acid, such as 99% sulfuric acid, is pumped from pump vessel 14 and fed in stream 15 over drying column 10, so as to pass in mass exchange with inlet gases coming in through stream 13.

The resulting dry gas 16, optionally after passage through a demister, is then compressed by compressor 17 to a pressure such as 3 to 6 atmospheres; and, if these gases are substantially below ignition temperature, they are then preheated by passage through heat exchanger 18. Alternately, the air stream 11 and sulfur dioxide stream 12 may be separately compressed and either or both dried (preferably before compression) and then combined as dry, compressed gas streams. The compressed and preheated gas mixture is fed through stream 19 into a tube-in-shell converter 20. The inner tubes 21 of the converter 20 are each filled with a packed bed of catalyst 22 and are surrounded by a shell 23. A representative size for the converter is 0.1508 feet (4.596 cm) inner diameter of the tube, 547 tubes in a shell, 5.3306 feet (1.625 m) inner diameter of the shell and 12 feet (3.66 m) in length for the tubes. The shell will be somewhat longer because of header spaces on both ends of the tubes. The gas mixture after conversion is removed from the tube 22 through stream 24 as described further below.

Furthermore, air is passed into the shell 23 through stream 25 in countercurrent flow to the process gas mixture and is withdrawn from the shell 23 in stream 26, and passed through a waste heat boiler 27 where it is cooled back down to a desirable temperature for stream 25 such as 300° C. It will be appreciated that waste heat boiler 27 can accordingly generate steam of relatively high pressure by extracting the heat from the cooling air. The converter effluent in stream 24 passes through heat exchanger 18 to preheat incoming gas mixture and then through stream 28 to a condenser 29 where it is cooled further to a temperature such as about 35°–45° C. at which a substantial portion of the sulfur trioxide condenses out of the gas mixture at the elevated pressure. The gas mixture then passes through vapor-liquid separation vessel 30 where the liquid sulfur trioxide remains and can be removed as a product through stream 31. The uncondensed vapors are removed from vessel 30 through stream 32 and a portion directed through stream 33 to an oleum column 34. The remainder of stream 32 passes into stream 39 as described below.

Oleum column 34 operates in a conventional fashion with oleum pumped from vessel 35 and passed over the column in mass exchange with upcoming vapors from stream 33. The result is to increase the oleum concentration in 35, with a portion thereof bled off from vessel 35 in stream 36 as product oleum of a concentration such as 20 percent. Stronger oleum concentrations can be achieved by mixing 20% oleum in stream 36 with liquid sulfur trioxide in stream 47, which is a portion of stream 31.

The vapor from oleum column 34 is removed in a stream 38 and combined with stream 39 which represents the remainder of stream 32. Streams 38 and 39 are combined into stream 40, now representing all of the uncondensed and unabsorbed vapors from the converter effluent, which is passed to a conventional sulfuric acid absorption tower 41. In absorption tower 41 the sulfur trioxide content of stream 40 is absorbed leaving the sulfur dioxide and any inerts such as nitrogen or excess air to be removed in stream 42 which, depending upon its pressure, is either expanded and vented or is directly vented. The conversions in converter 20 are sufficiently high that the residual sulfur dioxide in stream 42 is not objectionable.

The sulfuric acid formed in the absorption tower 41 (e.g. 99%) is cooled and collected in pump vessel 43, with a portion pumped to the top of the absorption tower for absorption of incoming gases. A portion of the 99% sulfuric acid in vessel 43 may be taken as product, or may be mixed with liquid sulfur trioxide from stream 31 to make either weak or strong oleum, depending upon the product mix desired. A third portion of the strong sulfuric acid (e.g., 99%) from vessel 43 is directed through stream 44 through a second cooler and then to pump vessel 14 for use in the drying column. Diluted acid (e.g. 97%) from the drying column 10 is returned in stream 45 through a cooler to absorption tower 41 to dilute the acid from the absorption tower back to the desired concentration (e.g. 99%). If the water content of incoming air and sulfur dioxide is insufficient to maintain the acid strengths desired in drying column 10 and absorption tower 41, make up water may be added, e.g. in stream 46 which is mixed with the 97% sulfuric acid returning in stream 45 from the drying column 10 to the absorption tower 41.

EXAMPLE 1

A mixture of 55.88 mol % sulfur dioxide, 41.91 mol % oxygen and 2.21 mol % nitrogen, can be formed by burning sulfur in 95% oxygen and 5% nitrogen. If this mixture is fed at 1.6 atmospheres (162 kPa) pressure and about 830° F (443° C.) at a rate of 4.177 mol/min to a reactor, the partial pressures of sulfur dioxide and oxygen will be 0.894 and 0.671, respectively, while the ratio therebetween will be 0.75:1. The reactor used in this model is a tube-in-shell, 12 feet (3.66 m) in tube length and 0.1508 feet (4.596 cm) tube inside diameter, packed with a vanadium pentoxide catalyst at 38.5 pounds per cubic foot (513 kg/m$^3$). The design assumes a 0.720 activity factor for the catalyst after several years of use, but other activities can be compensated for by varying other conditions such as air flow rate. The moles of sulfur dioxide, oxygen, sulfur trioxide and nitrogen can be calculated, for each single tube, assuming that heat exchange for that tube can be controlled to achieve the desired temperature profile. Using increments of 0.1 foot (3.05 cm), 122 points are generated (the first and last being outside the catalyst bed). Thirteen of these points are shown in Table 1, with the sixth point representing the temperature maximum. All units are given in moles of the particular compound per 100 moles of total inlet gases. The corresponding value of nitrogen is 2.21 at all points.

TABLE 1

| Sulfur Burned With 95% Oxygen | | | | |
|---|---|---|---|---|
| Distance from Inlet | | Temp | Sulfur | | Sulfur |
| (feet) | (m) | (°C.) | Dioxide | Oxygen | Trioxide |
| 0 | 0 | | 55.88 | 41.91 | 0.00 |
| 0.3 | 0.09 | 461 | 51.17 | 39.55 | 4.71 |
| 1.5 | 0.46 | 495 | 37.65 | 32.79 | 18.23 |
| 2.7 | 0.82 | 510 | 27.76 | 27.85 | 28.12 |
| 3.9 | 1.19 | 517.4 | 19.77 | 23.86 | 36.11 |
| 4.6 | 1.40 | 518.7 | 15.77 | 21.86 | 40.11 |
| 5.1 | 1.55 | 517.8 | 13.18 | 20.56 | 42.70 |
| 6.3 | 1.92 | 509.5 | 7.87 | 17.90 | 48.01 |
| 7.5 | 2.29 | 489.7 | 3.96 | 15.95 | 51.92 |
| 8.7 | 2.65 | 457.1 | 1.59 | 14.77 | 54.29 |
| 9.9 | 3.02 | 425.4 | 0.56 | 14.25 | 55.32 |
| 11.1 | 3.38 | 396.3 | 0.26 | 14.10 | 55.62 |
| 12.1 | 3.69 | 379.3 | 0.16 | 14.05 | 55.72 |

It can be seen that these figures represent a 99.7% conversion of sulfur dioxide to sulfur trioxide and, therefore, a sulfur trioxide:sulfur dioxide ratio in the effluent of about 340:1. Cooling this effluent to 40° C. will condense 88% of the sulfur trioxide without condensing the sulfur dioxide to produce a liquid of pure sulfur trioxide, and a remaining gas mixture of 60.80% oxygen, 28.95% sulfur trioxide, 9.56% nitrogen, and 0.69% sulfur dioxide. Such remaining gas mixture can be absorbed in sulfuric acid in a conventional fashion and passed through a demister to produce a stack gas of 85.5% oxygen, 13.46% nitrogen and 0.97% sulfur dioxide. The sulfuric acid produced could be mixed with a portion of the liquid sulfur trioxide to produce one or more oleum products of varying strengths.

EXAMPLE 2

Pure Sulfur Dioxide And Air

A stream of 1316 mol/min (174 pound moles/h) SO$_2$ can be formed by drying sulfur dioxide scrubbed from a flue gas. If this stream is combined with 4707 mol/min (622 pound moles/h) air, a combined stream of 21.85% sulfur dioxide, 16.39% oxygen and 61.76% nitrogen is formed, which can be introduced at a pressure of 7.622 atmospheres (772 kPa) and a rate of 6024 mol/min (796 pound moles/h) into a reactor having 547 tubes, each 46 mm inside diameter and 12 feet (3.66 m) length in a shell 1.62 m inside diameter. The feed gas partial pressure of sulfur dioxide in this example (about 1.67 atmospheres) is above the most preferred range of about 0.8 to 0.9 atmospheres, because the conditions were chosen for high liquid sulfur trioxide recovery. For improved heat transfer in the first 1.14 m of length, 12 fins are provided on the outside of each tube from the entrance to a point 1.14 m from the entrance. Each fin has a height of about 6.35 mm and a thickness of 1.2 mm. A manifold is provided to distribute the air evenly between each tube. The tubes are arranged in a fashion that each three adjacent tubes from an equilateral triangle with a distance between tube centers of about 63.5 mm.

The flows were computed for each 0.1 foot of the tube in units of moles of the particular gas per 100 moles of total inlet gases. Table 2 shows 15 of these points. Also indicated is the temperature of the air in the shell around each point. The nitrogen flow in the tube was 61.76 at all points.

TABLE 2

| Pure SO$_2$ Plus Air | | | | | | |
|---|---|---|---|---|---|---|
| Distance from Inlet | | Sulfur | | Sulfur | Process Gas | Air Temp |
| Feet | (m) | Dioxide | Oxygen | Trioxide | Temp (°C.) | (°C.) |
| 0 | 0 | 21.85 | 16.39 | 0 | 328.2 | 418.7 |
| 0.9 | 0.27 | 20.61 | 15.77 | 1.24 | 397.1 | 427.4 |
| 1.2 | 0.37 | 19.13 | 15.03 | 2.72 | 437.6 | 428.2 |
| 1.5 | 0.46 | 17.66 | 14.29 | 4.19 | 475.1 | 427.1 |
| 2.0 | 0.61 | 15.70 | 13.31 | 6.15 | 506.2 | 422.1 |
| 2.8 | 0.85 | 13.15 | 12.04 | 8.70 | 517.2 | 410.1 |
| 3.8 | 1.16 | 10.38 | 10.65 | 11.47 | 507.4 | 392.8 |
| 5.1 | 1.55 | 7.33 | 9.13 | 14.52 | 526.2 | 379.8 |
| 5.6 | 1.71 | 6.30 | 8.61 | 15.56 | 526.4 | 374.2 |
| 6.3 | 1.92 | 4.94 | 7.94 | 16.91 | 522.6 | 366.0 |
| 7.5 | 2.29 | 2.90 | 6.91 | 18.96 | 508.1 | 351.7 |
| 8.7 | 2.65 | 1.30 | 6.11 | 20.56 | 484.3 | 337.9 |
| 9.9 | 3.02 | 0.37 | 5.65 | 21.48 | 449.7 | 325.5 |
| 11.1 | 3.38 | 0.10 | 5.51 | 21.75 | 408.6 | 315.7 |
| 12.0 | 3.66 | 0.05 | 5.49 | 21.79 | 381.9 | 310.1 |

The temperature profile of the process gas shows preheating in the first 0.6 foot (0.18 m) before appreciable reaction occurs, a rapid temperature rise to a maximum of 517.2° C. at 0.85 m, a slow decline to a local minimum of 507.4° C. at 1.16 m, a moderate rise to 526.2° C. at 1.55 m, a substantially level temperature between 1.55 m and 1.7 m, a gradual decline to 522.6° C. at 1.92 m and a moderate decline throughout the remainder of the tube to an exit temperature of about 380° C.

The maximum sulfur dioxide oxidation rate occurs at 1.2 feet (0.37 m) in the first zone of rising temperature at a temperature of about 438° C. The section of tube between the inlet at 328.2° C. and about 2 feet (0.61 m) at 506.2° C. can be considered the first zone of increasing temperature. The second zone, from 2 feet (0.61 m) at 506.2° C. to 7.5 feet (2.29 m) at 508.1° C. has a reaction gas temperature between 500° C. and 530° C., which is thus substantially constant. In this second zone, sulfur dioxide is rapidly oxidized toward, but not achieving, the equilibrium concentration at those temperatures. In the third zone, form 7.5 feet (2.29 m) at 508.1° C. to 12.0 feet (3.66 m) at 318.9° C., a declining temperature causes the equilibrium to be shifted toward lower sulfur dioxide proportions, such that the remaining sulfur dioxide can be oxidized to permissably low residual levels in reasonably short reaction volumes. The final gas mixture contains about 0.05 moles of sulfur dioxide and 21.79 moles of sulfur trioxide, which represents a molar ratio greater than 332:1. Condensation of this final gas mixture at 40° C. would produce 900 mol/min (119 pound moles/h) of liquid sulfur trioxide and a remaining vapor mixture of 0.07 mol % sulfur dioxide, 7.39 mol % oxygen, 9.26 mol % sulfur trioxide and 83.28 mol % nitrogen suitable for feeding to an oleum or acid absorption tower.

We claim:

1. A process for the production of sulfur trioxide which comprises the steps:
   (a) feeding a gas mixture having a sulfur dioxide partial pressure of at least about 0.5 atmosphere, an oxygen partial pressure of at least about 0.37 atmosphere, an oxygen:sulfur dioxide mole ratio of between about 0.7:1 and about 1:1 and a total pressure between about 1 atmosphere and about 10 atmospheres in plug flow through a bed of a conversion catalyst selected from the group consisting of vanadium oxide conversion catalysts and platinum conversion catalysts;
   (b) cooling the catalyst bed to produce a first zone wherein the gas mixture increases in temperature from the inlet temperature to a temperature between about 475° C. and about 575° C., a second zone wherein the temperature is substantially constant at a temperature between about 450° C. and about 575° C. and a third zone wherein the temperature is declining from a temperature between about 450° C. and about 575° C. to a temperature between about 325° C. and about 400° C.,
   (c) passing said gas mixture successively through said first, second and third zones with sufficient contact times in said second and third zones to produce a product gas mixture with an sulfur trioxide to sulfur dioxide mole ratio of at least about 99:1,
   (d) cooling said product gas mixture to a temperature between about 35° C. and about 45° C. to produce liquid sulfur trioxide, and
   (e) separating said liquid sulfur trioxide from the remaining gas stream.

2. The process of claim 1 wherein said remaining gas stream is contacted with sulfuric acid of acid strength between about 95% and about 99% to absorb sulfur trioxide and produce concentrated sulfuric acid.

3. The process of claim 1 wherein said gas mixture has a sulfur dioxide partial pressure of at least about 0.8 atmosphere, an oxygen partial pressure of at least about 0.6 atmosphere and said oxygen:sulfur dioxide mole ratio is between about 0.7:1 and about 0.8:1.

4. The process of claim 3 wherein said sulfur dioxide partial pressure is between about 0.8 atmosphere and about 0.9 atmosphere.

5. The process of claim 1 wherein said first zone is maintained at a peak temperature between about 500 and about 525° C., said second zone is maintained at temperatures between about 500 and about 550° C. and said third zone is maintained at a lowest temperature between about 360 and about 390° C.

6. The process of claim 1 or 5 wherein steps b and c are conducted in a tube-in-shell reactor, said catalyst bed is packed in each tube, said gas mixture is passed through each tube within the shell through said first, second and third zones, and cooling gas is passed within said shell outside each tube in heat exchange relation with each said third, second and first zones.

7. The process of claim 6 wherein the product gas mixture has a mole ratio of sulfur trioxide to sulfur dioxide at least about 332:1.

8. The process of claim 1 wherein the product gas mixture has a mole ratio of sulfur trioxide to sulfur dioxide at least about 332:1.

9. The process of claim 1 wherein at least a portion of said remaining gas stream is absorbed in oleum of strength between about 10% and about 25%.

10. The process of claim 9 wherein at least a portion of said oleum of strength between about 10% and about 25% is mixed with a portion of said liquid sulfur trioxide.

11. The process of claim 1 wherein at least a portion of said remaining gas stream is absorbed in sulfuric acid of strength between about 95% and about 99%.

12. The process of claim 11 wherein at least a portion of said sulfuric acid is mixed with a portion of said liquid sulfur trioxide to produce oleum.

* * * * *